United States Patent [19]

Maruyama et al.

[11] 4,047,426
[45] Sept. 13, 1977

[54] SONIC NOZZLE APPARATUS IN A CARBURETOR FLOW TESTING MACHINE

[75] Inventors: Iwao Maruyama, Kawagoe; Shigeo Kanai, Sayama, both of Japan

[73] Assignee: Honda Giken Kogyo Kabushiki Kaisha, Tokyo, Japan

[21] Appl. No.: 710,242

[22] Filed: July 30, 1976

[30] Foreign Application Priority Data

Aug. 1, 1975 Japan .................... 50-105738

[51] Int. Cl.² ................................ G01M 15/00
[52] U.S. Cl. .................................... 73/118
[58] Field of Search ................... 73/118, 211, 3

[56] References Cited

U.S. PATENT DOCUMENTS

| 3,079,796 | 3/1963 | Freudenthal et al. | 73/211 |
| 3,469,442 | 9/1969 | Brueckner | 73/118 |

*Primary Examiner*—Jerry W. Myracle
*Attorney, Agent, or Firm*—Haseltine, Lake & Waters

[57] ABSTRACT

A sonic nozzle apparatus in a carburetor flow testing machine comprising a measuring pipe passage connecting a carburetor to be tested and a pressure source such as a vacuum pump or the like, the measuring pipe passage being provided at an intermediate portion with a cutout section in which a tubular nozzle chamber can be selectively introduced in sealed relation. A plurality of such tubular nozzle chambers are mounted on a turntable to be selectively introduced into the cutout and each nozzle chamber contains a respective sonic nozzle therein. The nozzle chambers are disposed circumferentially at regular intervals and the turntable is intermittently turnable on a support shaft disposed on one side of the measuring pipe passage. One of the mutually opposite surfaces of an upstream and a downstream portion of the measuring pipe passage divided by the cutout is constituted as a piston which is movable by a pressure fluid to selectively effect clamping or release of the nozzle chamber when aligned in the cutout.

9 Claims, 2 Drawing Figures

SONIC NOZZLE APPARATUS IN A CARBURETOR FLOW TESTING MACHINE

FIELD OF THE INVENTION

This invention relates to a sonic nozzle apparatus in a carburetor flow testing machine.

BACKGROUND OF THE INVENTION

It has been conventional in this kind of apparatus to arrange a plurality of sonic nozzles in a vertically disposed relationship within an intermediate portion of a single common nozzle chamber such that these nozzles may be opened and closed individually by means of respective corresponding valves. In this conventional arrangement, however, the chamber is comparatively large in size and this results in the formation of an expanded or enlarged chamber at the intermediate portion of the measuring pipe passage whereby the volume of the interior of the pipe passage is increased and this is liable to become an unnecessary load for pressure adjustment. Additionally, fuel within an air-fuel mixture is liable to be accumulated at the bottom of the chamber, and this accumulated fuel can become the cause of measurement error. Therefore, its removal is essential, but in order to do so it is necessary to stop the testing operation during such removal resulting in inefficient operation.

SUMMARY OF THE INVENTION

An object of the invention is to provide sonic nozzle apparatus which is free from the above disadvantages.

In accordance with the invention there is provided in a sonic nozzle apparatus in a machine for testing flow in a carburetor connected to a suction pressure source: measuring passage means connecting the carburetor to the suction pressure source, said measuring passage means comprising a first passage connected to the carburetor, a second passage connected to the suction pressure source, said first and second passages defining a spaced cutout portion therebetween, a plurality of tubular nozzle chambers, and means for selectively introducing one of said chambers into said cutout portion to establish communication between said first and second passages.

In further accordance with the invention said means for selectively introducing one of said nozzle chambers into said cutout portion comprises a turntable carrying said nozzle chambers and a rotatable shaft supporting said turntable. The nozzle chambers are circumferentially mounted on the turntable in spaced relation and a motor is coupled to the shaft to turn the same intermittently.

In further accordance with the invention, one of said passages includes a piston for clamping the selected nozzle chamber in said cutout portion in sealed relation with said first and second passages. Preferably the piston is constituted as part of a fluid operated cylinder.

DETAILED DESCRIPTION

Figure 1:
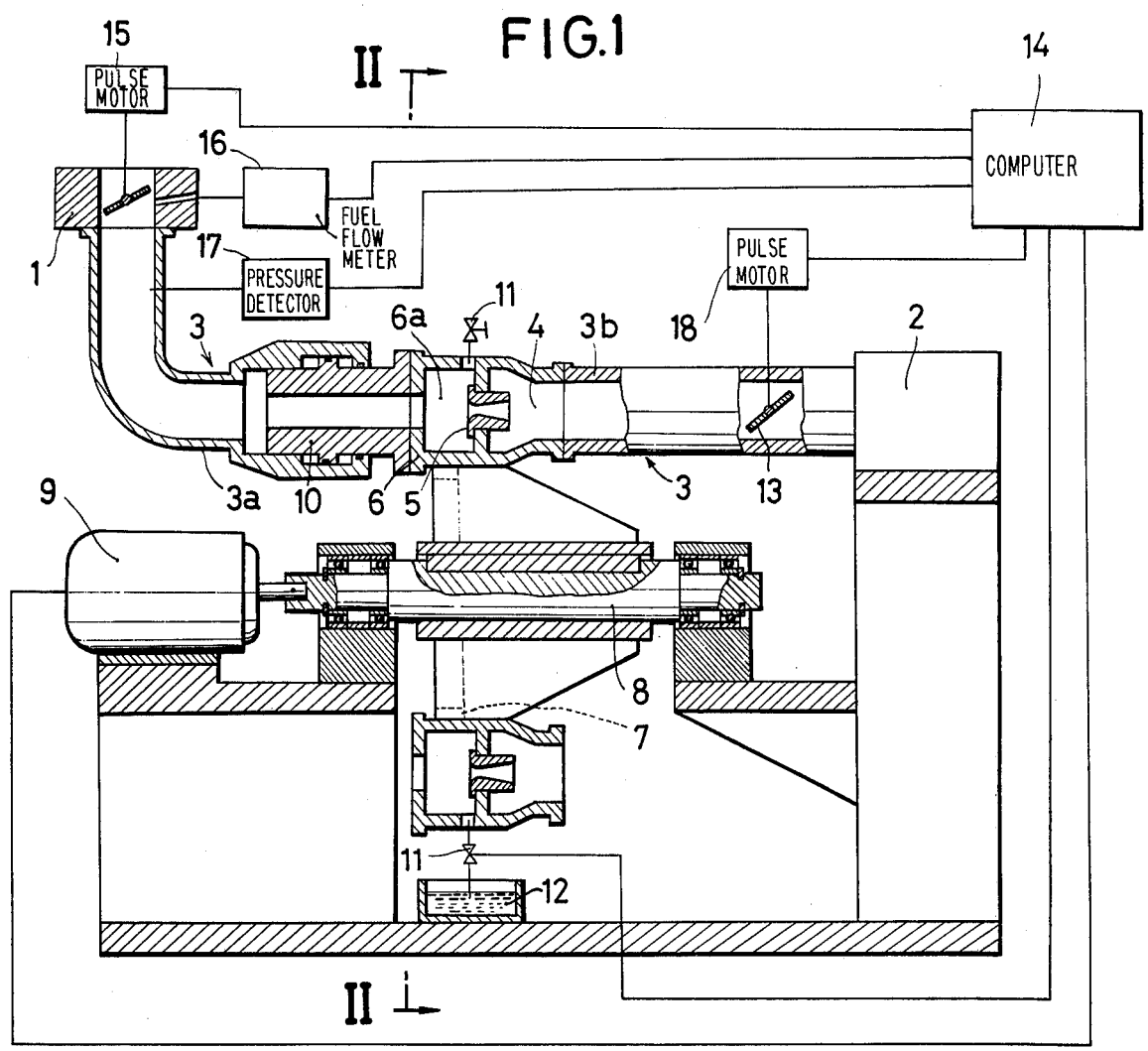
FIG. 1 is a sectional side view of one embodiment according to the invention.
Figure 2:
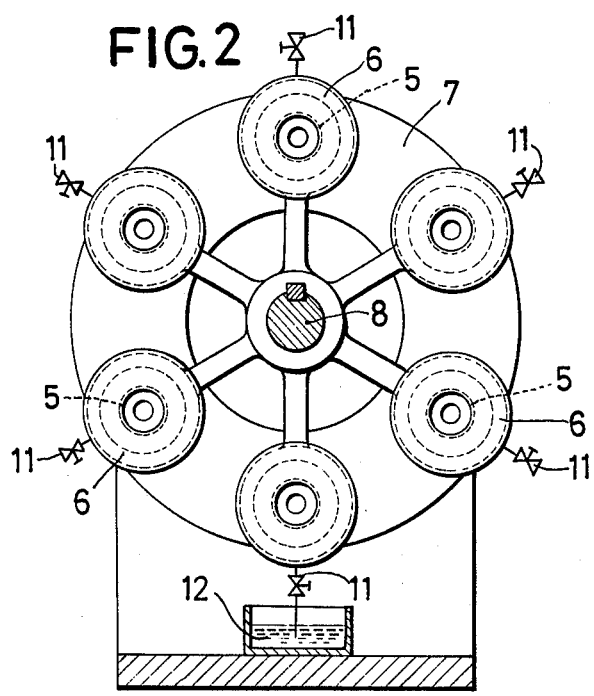
FIG. 2 is a sectional view taken along line II—II in FIG. 1.

In the drawing, a carburetor 1 to be tested is connected to a pressure source 2, such as a vacuum pump or the like, by a measuring pipe passage 3. The passage 3 is provided at a middle portion with a cutout portion 4. A turntable 7 carries a plurality of tubular nozzle chambers 6 arranged to be selectively introduced in the cutout portion 4 and each chamber 6 contains therein a sonic nozzle 5. The chambers 6 are disposed circumferentially at given intervals. The turntable is rotatably mounted on a center shaft 8 disposed on one side of the measuring pipe passage 3 such that the turntable may be turned intermittently by means of an electric motor 9 or the like.

The measuring pipe passage 3 is divided by the intermediate cutout portion 4 into an upstream portion 3a and a downstream portion 3b, and at least one of the mutually opposing surfaces of the two portions 3a, 3b is constituted as a piston 10 which is movable to advance and retreat by fluid pressure or the like, so that by an advance movement of the piston 10 the particular nozzle chamber 6 selected to be in operating position is clamped at the front and rear so as to be maintained in air-tight relation between the two portions 3a, 3b. Each chamber 6 is formed to be of a comparatively small size corresponding to the size of the single nozzle 5 contained therein, and each chamber 6a at its upstream side is provided with a drain valve 11, so that when each chamber 6 reaches the lowermost position on the diametrically opposite side of its operating position, the valve 11 is opened and thereby any fuel accumulated in the chamber 6 is discharged therethrough into a recovery tank 12 provided on the lower side thereof. Referring to the drawing, numeral 13 denotes a control valve which can be opened and closed and provided in the downstream portion 3b, and numeral 14 denotes a computer for automatic control of the entire operation of the apparatus. Numeral 15 denotes a pulse motor, numeral 16 denotes a fuel flow meter, numeral 17 denotes a pressure detector and numeral 18 denotes a pulse motor.

According to the invention, the plurality of sonic nozzles 5, each contained in a respective chamber 6, are disposed on turntable 7 circumferentially at suitable intervals and are arranged to be selectively brought into cutout portion 4, i.e. in operating position, so that the deficiencies in the conventional arrangement using a single nozzle chamber common to the plurality of sonic nozzles can be simply and positively removed.

It's to be understood that when a nozzle chamber 6 is clamped in the measuring pipe passage 3 the attending operation is the same as that in the conventional arrangements and consequently requires no detailed description herein. The feature of the invention is the manner in which the chambers are selectively introduced into the cutout portion.

Although the invention has been described in conjunction with a specific embodiment thereof, it will become evident to those skilled in the art that numerous modifications and variations can be made without departing from the scope and spirit of the invention as defined in the attached claims.

What is claimed is:

1. In a sonic nozzle apparatus in a machine for testing flow in a carburetor connected to a suction pressure source: measuring passage means connecting the carburetor to the suction pressure source, said measuring passage means comprising a first passage connected to the carburetor, a second passage connected to the suction pressure source, said first and second passages defining a spaced cutout portion therebetween, a plurality of tubular nozzle chambers, each nozzle chamber including a respective sonic nozzle therein and upstream and downstream chamber portions on opposite sides of said sonic nozzle, and means for selectively introducing one of said nozzle chambers into said cutout portion to establish communication between said first and second passages.

2. Apparatus as claimed in claim 1 wherein said means for selectively introducing one of said nozzle chambers into said cutout portion comprises a turntable carrying said nozzle chambers, and a rotatable shaft supporting said turntable.

3. Apparatus as claimed in claim 2 wherein said nozzle chambers are circumferentially mounted on said turntable in spaced relation.

4. Apparatus as claimed in claim 3 comprising a motor coupled to said shaft to turn the same intermittently.

5. Apparatus as claimed in claim 3 wherein said shaft is disposed on one side of said measuring passage means.

6. Apparatus as claimed in claim 3 wherein at least one of said passages includes a piston for clamping the selected nozzle chamber in said cutout portion in sealed relation with said first and second passages.

7. Apparatus as claimed in claim 6 wherein said piston is constituted as part of a fluid-operated cylinder.

8. Apparatus as claimed in claim 1 comprising valve means for emptying the upstream chamber portion of each nozzle chamber.

9. Apparatus as claimed in claim 8 comprising a tank disposed adjacent and below the path of travel of the nozzle chambers for receiving any accumulated fuel in the upstream nozzle chamber portion of an adjacent nozzle chamber when the associated valve means is opened.

* * * * *